US012796579B2

(12) United States Patent
Kapraun et al.

(10) Patent No.: US 12,796,579 B2
(45) Date of Patent: Nov. 17, 2026

(54) SENSOR SUPPORT ASSEMBLY FOR AN AGRICULTURAL IMPLEMENT

(71) Applicant: CNH Industrial America LLC, New Holland, PA (US)

(72) Inventors: Kyle J. Kapraun, La Moille, IL (US); Michael R. Cozza, Pittsburgh, PA (US); Joshua D. Knoblauch, Lowpoint, IL (US)

(73) Assignee: CNH Industrial America LLC, New Holland, PA (US)

( * ) Notice: Subject to any disclaimer, the term of this patent is extended or adjusted under 35 U.S.C. 154(b) by 792 days.

(21) Appl. No.: 18/073,199

(22) Filed: Dec. 1, 2022

(65) Prior Publication Data

US 2024/0180055 A1 Jun. 6, 2024

(51) Int. Cl.
*A01B 23/04* (2006.01)
*A01B 76/00* (2006.01)
*A01B 79/00* (2006.01)

(52) U.S. Cl.
CPC .............. *A01B 23/04* (2013.01); *A01B 76/00* (2013.01); *A01B 79/005* (2013.01)

(58) Field of Classification Search
CPC ....... A01B 23/04; A01B 76/00; A01B 79/005; A01B 69/001
See application file for complete search history.

(56) References Cited

U.S. PATENT DOCUMENTS

| | | | | |
|---|---|---|---|---|
| 6,397,569 | B1 * | 6/2002 | Homburg | A01D 41/1278 56/10.2 F |
| 10,827,666 | B2 * | 11/2020 | Schoeny | A01B 67/00 |
| 11,064,646 | B2 * | 7/2021 | Zemenchik | A01C 5/064 |
| 11,589,500 | B2 * | 2/2023 | Johnson | A01C 7/20 |
| 12,022,760 | B2 * | 7/2024 | Strnad | A01B 79/005 |
| 2015/0305228 | A1 * | 10/2015 | Zemenchik | A01B 67/00 172/4 |
| 2018/0356389 | A1 * | 12/2018 | Willness | G01C 9/06 |
| 2019/0360552 | A1 * | 11/2019 | Henry | G01S 13/88 |
| 2020/0084965 | A1 * | 3/2020 | Neitemeier | A01D 41/1271 |
| 2021/0056721 | A1 * | 2/2021 | Barrick | A01B 69/001 |
| 2022/0287227 | A1 * | 9/2022 | Karki | A01B 79/005 |
| 2022/0322598 | A1 * | 10/2022 | Hunt | A01D 41/14 |
| 2024/0029429 | A1 * | 1/2024 | Underwood | G06V 20/56 |
| 2024/0357968 | A1 * | 10/2024 | Hunt, II | A01D 41/127 |

FOREIGN PATENT DOCUMENTS

EP 2316259 A1 * 5/2011 ......... A01D 41/1278

* cited by examiner

*Primary Examiner* — Ernesto A Suarez
(74) *Attorney, Agent, or Firm* — Dority & Manning, P.A.

(57) ABSTRACT

An agricultural implement includes a frame, a ground-engaging tool supported on the frame, and a sensor. Additionally, the implement includes a sensor support assembly configured to support the sensor relative to the frame. The sensor support assembly includes a first support arm extending along a longitudinal axis of the from a first end to a second end, with the first end coupled to the frame and the second end coupled to the sensor. Moreover, the sensor support assembly includes a second support arm extending along a longitudinal axis from a first end to a second end, with the first end coupled to the frame and the second end arm coupled to the sensor. In addition, an oblique angle is defined between the longitudinal axis of the first support arm and the longitudinal axis of the second support arm.

20 Claims, 6 Drawing Sheets

SENSOR SUPPORT ASSEMBLY FOR AN AGRICULTURAL IMPLEMENT

FIELD OF THE INVENTION

The present disclosure generally relates to agricultural implements and, more particularly, to a sensor support assembly for an agricultural implement.

BACKGROUND OF THE INVENTION

It is well known that, to attain the best agricultural performance from a field, a farmer must cultivate the soil, typically through a tillage operation. Modern farmers perform tillage operations using a tillage implement being pulled behind an agricultural work vehicle, such as a tractor. In general, tillage implements include ground-engaging tools, such as shanks, disks, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations. Moreover, such movement of the ground-engaging tools may size and/or bury residue present on the field surface.

Upon completion of the tillage operation, it is generally desirable that the surface of the field have certain characteristics or parameters, such as a given surface profile or levelness, soil clod size distribution, and/or the like. In this respect, systems for monitoring field characteristics/parameters have been developed. While such systems work well, further improvements are needed. For example, many such systems rely on a sensor (e.g., a LiDAR sensor, a RADAR sensor, etc.) to generate data indicative of the field characteristics/parameters. However, bumps, divots, and other impediments within the field may cause movement of the sensor relative to the frame of the implement. Such movement may, in turn, impact the quality of the data generated by the sensor.

Accordingly, an improved sensor support assembly for an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement including a frame extending in a transverse direction between a first side of the frame and a second side of the frame. Furthermore, the agricultural implement includes a ground-engaging tool supported on the frame and a sensor configured to generate data indicative of a field parameter. Additionally, the agricultural implement includes a sensor support assembly configured to support the sensor relative to the frame. The sensor support assembly includes a first support arm extending along a longitudinal axis of the first support arm from a first end of the first support arm to a second end of the first support arm, with the first end of the first support arm coupled to the frame and the second end of the first support arm coupled to the sensor. Moreover, the sensor support assembly includes a second support arm extending along a longitudinal axis of the second support arm from a first end of the second support arm to a second end of the second support arm, with the first end of the second support arm coupled to the frame and the second end of the second support arm coupled to the sensor. In addition, an oblique angle is defined between the longitudinal axis of the first support arm and the longitudinal axis of the second support arm.

In another aspect, the present subject matter is directed to a tillage implement including a frame extending in a transverse direction between a first side of the frame and a second side of the frame. Furthermore, the tillage implement includes a vertical tillage tool supported on the frame and a sensor configured to generate data indicative of a field parameter. Additionally, the tillage implement includes a sensor support assembly configured to support the sensor relative to the frame. The sensor support assembly includes a first support arm extending along a longitudinal axis of the first support arm from a first end of the first support arm to a second end of the first support arm, with the first end of the first support arm coupled to the frame and the second end of the first support arm coupled to the sensor. Moreover, the tillage implement includes a second support arm extending along a longitudinal axis of the second support arm from a first end of the second support arm to a second end of the second support arm, with the first end of the second support arm coupled to the frame and the second end of the second support arm coupled to the sensor. In addition, an oblique angle is defined between the longitudinal axis of the first support arm and the longitudinal axis of the second support arm.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
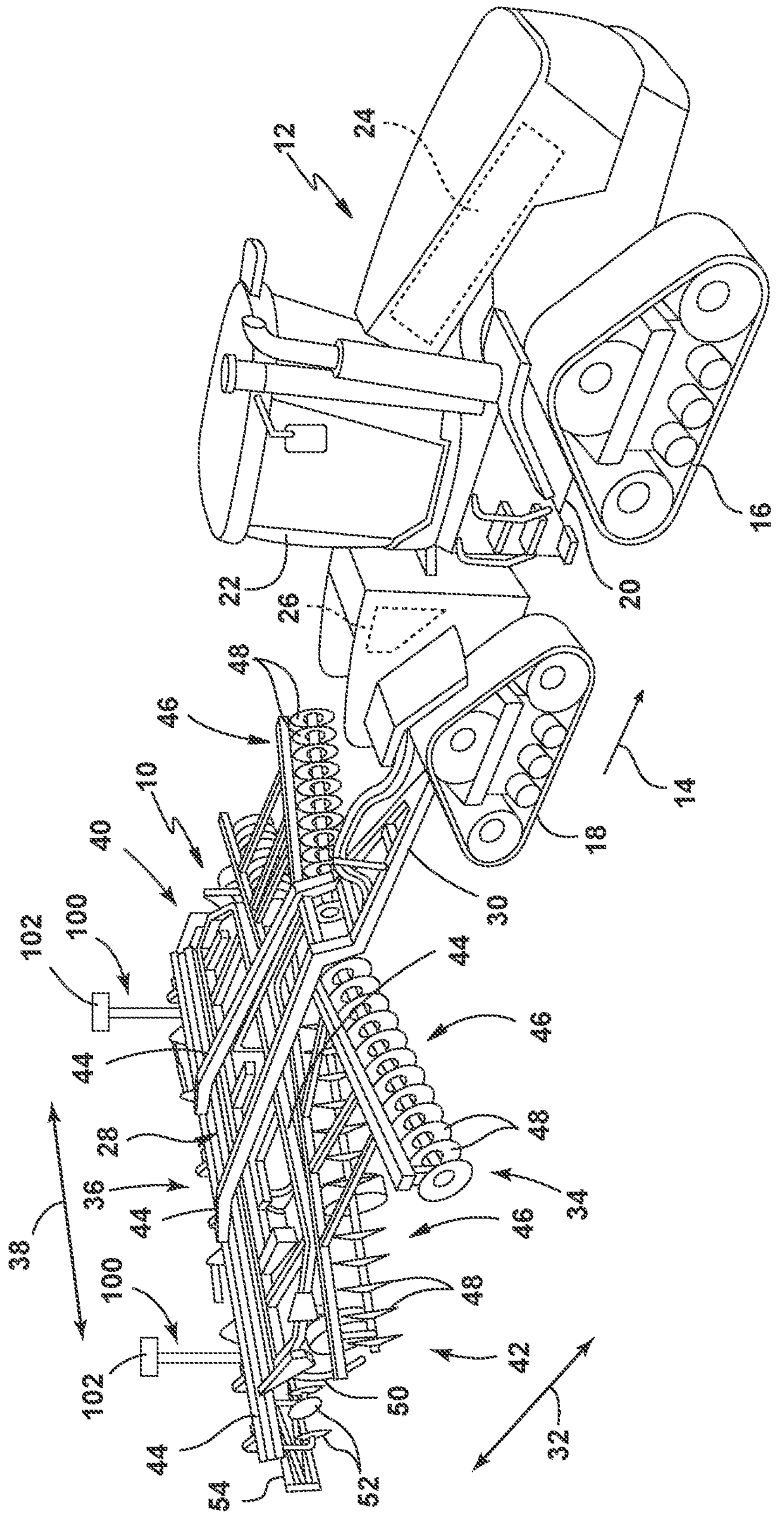
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a sensor support assembly for an agricultural implement. As will be described below, the agricultural implement includes a frame extending in a transverse direction between a first side and a second side. Furthermore, the agricultural implement includes one or more ground-engaging tools (e.g., a disk blade or other vertical tillage tool, a shank, a leveling blade, a basket assembly, etc.) supported on the frame. Additionally, the agricultural implement includes a sensor (e.g., a transceiver-based sensor, such as a LiDAR sensor, a RADAR sensor, etc.) configured to generate data indicative of a field characteristic or parameter, such as surface profile, soil clod size distribution, and/or the like.

In several embodiments, the sensor support assembly is configured to support the sensor relative to the frame. More specifically, the sensor support assembly includes a first support arm extending along a longitudinal axis from a first end to an opposed second end. The first end of the first support arm is, in turn, coupled to the frame (e.g., at a first location). Conversely, the second end of the first support arm is coupled to the sensor. Moreover, the sensor support assembly includes a second support arm extending along a longitudinal axis from a first end to an opposed second end. The first end of the second support arm is, in turn, coupled to the frame (e.g., at a second location). Conversely, the second end of the second support arm is coupled to the sensor. In addition, an oblique angle is defined between the longitudinal axis of the first support arm and the longitudinal axis of the second support arm. As such, in some embodiments, the first and second locations are spaced apart from each other in the transverse direction. Furthermore, in one embodiment, the first location may be positioned forward of the second location relative to the direction of travel of the implement.

The disclosed sensor support assembly improves the quality of the data being captured by the LiDAR sensor. More specifically, bumps, divots, and other impediments within the field may cause movement of the sensor relative to the frame of the implement. For example, in certain instances, the field impediments may cause the sensor to rotate relative to the frame (e.g., about a vertical axis). Such relative rotation may, in turn, cause the sensor to generate reduced quality data. However, as described above, the sensor support assembly includes first and second support arms coupled between the implement frame and the sensor such that an oblique angle is defined between their respective longitudinal axes. Such positioning of the arms (i.e., with the oblique angle defined therebetween) improves the torsional strength of the sensor support assembly, thereby reducing or eliminating rotation of the sensor when the implement encounters a field impediment. Thus, the disclosed sensor support assembly improves the ability of the LiDAR sensor to monitor the performance of the agricultural implement by allowing the LiDAR sensor to generate high quality data.

Referring now to the drawings, FIG. 1 illustrates a perspective view of one embodiment of an agricultural implement 10 and an associated agricultural work vehicle 12 in accordance with aspects of the present subject matter. In general, the agricultural implement 10 is configured to be towed across a field by the work vehicle 12 in a direction of travel (indicated by arrow 14). For example, in one embodiment, the agricultural implement 10 is configured as a tillage implement (e.g., a disk ripper) and the work vehicle 12 is configured as an agricultural tractor. However, in other embodiments, the agricultural implement 10 may be configured as any other suitable agricultural implement, such as another type of tillage implement, a seeder, planter, nutrient applicator, etc. Similarly, the work vehicle 12 may be configured as any other suitable work vehicle, such as an agricultural harvester, a self-propelled sprayer, etc.

As shown, the work vehicle 12 includes a pair of front track assemblies 16, a pair of rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 12 and/or one or more components of the agricultural implement 10. Furthermore, the work vehicle 12 includes an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, the agricultural implement 10 includes a frame 28 configured to be towed by the work vehicle 12 via a pull hitch or tow bar 30 in the direction of travel 14. As shown, the frame 28 extends in a longitudinal direction 32 between a forward end 34 of the frame 28 and an aft end 36 of the frame 28. The frame 28 also extends in a transverse direction 38 between a first side 40 of the frame 28 and a second side 42 of the frame 28. In general, the frame 28 may include a plurality of structural frame members 44, such as beams, bars, and/or the like, configured to support or couple to a plurality of components.

Moreover, the frame 28 may be configured to support a plurality of ground-engaging and/or ground-penetrating tools, such as a plurality of shank assemblies, vertical tillage tools (e.g., disk blades), leveling blades, basket assemblies, tines, spikes, and/or the like. In one embodiment, the various ground-engaging and/or ground-penetrating tools may be configured to perform a tillage operation or any other suitable ground-engaging operation on the field across which the agricultural implement 10 is being towed. For example, in the illustrated embodiment, the frame 28 is configured to support various assemblies or gangs 46 of disk blades 48, a plurality of shank assemblies 50, a plurality of leveling blades 52, and a plurality of crumbler wheels or basket assemblies 54. However, in alternative embodiments, the frame 28 may be configured to support any other suitable ground-engaging tool(s), ground-penetrating tool(s), or combinations of such tools.

It should be further appreciated that the configuration of the agricultural implement 10 and the work vehicle 12 described above and shown in FIG. 1 is provided only to place the present subject matter in an exemplary field of use. Thus, it should be appreciated that the present subject matter may be readily adaptable to any manner of agricultural implement and/or work vehicle configuration.

Furthermore, in several embodiments, one or more sensors 102 are mounted or otherwise supported on the agricultural implement 10. In general, and as will be described below; each sensor 102 is supported relative to the implement frame 28 by a sensor support assembly 100. As such, each sensor 102 has a field of view or a sensor detection range directed at a portion of a field across which the implement/vehicle 10/12 is traveling. Thus, each sensor 102 is configured to generate data indicative of one or more field parameters or characteristics associated with the field across which the implement/vehicle 10/12 is traveling. For example, such parameters/characteristics may include the surface profile or levelness of the field, the soil clod size distribution, the residue coverage, and/or the like.

In several embodiments, the sensor(s) 102 may correspond to a transceiver-based sensor(s). In such embodiments, the sensor(s) 102 may generally correspond to any suitable sensing device(s) configured to emit output signals for reflection off objects (e.g., the field surface) within an associated field of view and receive or sense the return signals. For example, in some embodiments, each sensor 102 may correspond to a LiDAR sensor configured to emit light/laser output signals for reflection off of the portion of the field surface present within its field of view. In such an embodiment, each sensor may receive the reflected return signals and generate point cloud data based on the received return signal(s). The point cloud data may, in turn, include a plurality of data points, with each point indicative of the distance between the sensor and the portion of the field surface off which one of the return signals is reflected. However, in other embodiments, the sensor(s) 102 may correspond to a RADAR sensor(s), an ultrasonic sensor(s), a camera(s), or any other suitable type of transceiver-based or non-transceiver-based sensor(s).

Additionally, in the illustrated embodiment, the agricultural implement 10 includes two sensors 102 supported thereon. However, in alternative embodiments, the implement 10 may include any other suitable number of sensors 102, such as a single sensor 102 or three or more sensors 102.

Figure 2:
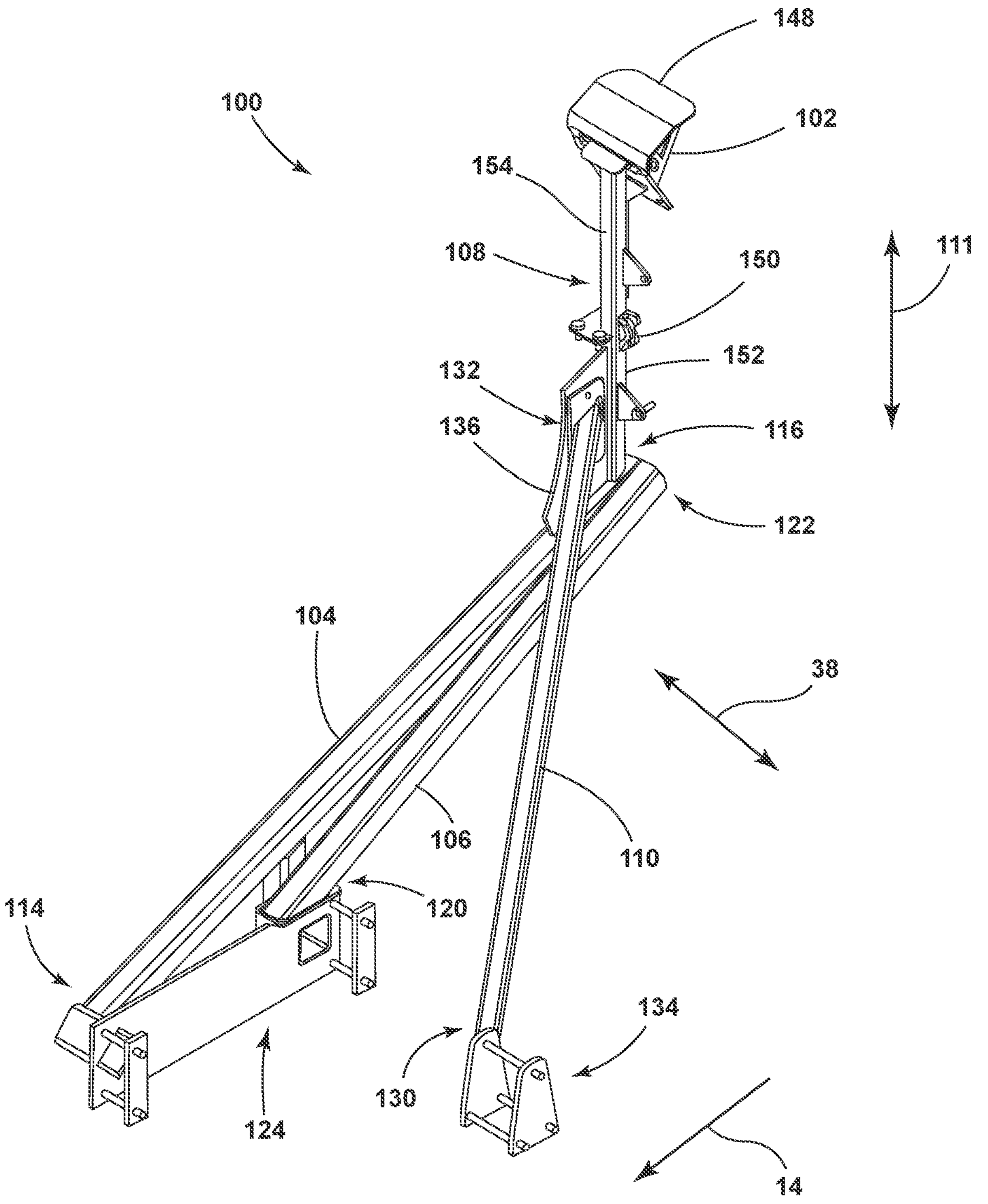
FIG. 2 illustrates a perspective view of one embodiment of a sensor support assembly for an agricultural implement in accordance with aspects of the present subject matter.

Referring now to FIG. 2, a perspective view of one embodiment of a sensor support assembly 100 for an agricultural implement is illustrated in accordance with aspects of the present subject matter. In general, the sensor support assembly 100 will be described herein with reference to the agricultural implement 10 described above with reference to FIG. 1. However, it should be appreciated by those of ordinary skill in the art that the disclosed sensor support assembly 100 may generally be utilized with agricultural implements having any other suitable implement configuration.

As shown, the sensor support assembly 100 includes various components that support the sensor 102 relative to the implement frame 28. More specifically, the sensor support assembly 100 includes first and second support arms 104, 106. Furthermore, in several embodiments, the sensor support assembly 100 includes a mounting arm 108. Additionally, in some embodiments, the sensor support assembly 100 includes a brace 110.

In general, the first and second sensor support arms 104, 106 are coupled between the frame 28 and the sensor 102. More specifically, the first support arm 104 extends along a longitudinal axis 112 (FIG. 4) of the first support arm 104 from a first end 114 of the first support arm 104 to a second end 116 of the first support arm 104. Similarly, the second support arm 106 extends along a longitudinal axis 118 (FIG. 4) of the second support arm 106 from a first end 120 of the second support arm 106 to a second end 122 of the second support arm 106. In this respect, the first ends 114, 120 of the first and second support arms 104, 106 are coupled to the frame 28, such as via fasteners 124. In other embodiments, two different sets of fasteners may be used to the first and second support arms 104, 106 to the frame 28. Conversely, the second ends 116, 122 of the first and second support arms 104, 106 are coupled to the sensor 102. For example, in the illustrated embodiment, the second ends 116, 122 of the first and second support arms 104, 106 are coupled to the mounting arm 108, which is, in turn, coupled to the sensor 102. However, in alternative embodiments, the first and second support arms 104, 106 may be coupled to the sensor 102 in any other suitable manner.

Moreover, the brace 110 is coupled between the frame 28 and the sensor 102. More specifically, the brace 110 extends along a longitudinal axis 128 (FIG. 4) of the brace 110 from a first end 130 of the brace 110 to a second end 132 of the brace 110. The first end 130 of the brace 110 is, in turn, coupled to the frame 28, such as via fasteners 134. Conversely, the second end 132 of the brace 110 is coupled to the sensor 102. For example, in the illustrated embodiment, the second end 132 of the brace 110 is coupled to a bracket 136, which is, in turn, coupled to the mounting arm 108. However, in alternative embodiments, the brace 110 may be coupled to the sensor 102 in any other suitable manner.

Figure 3:
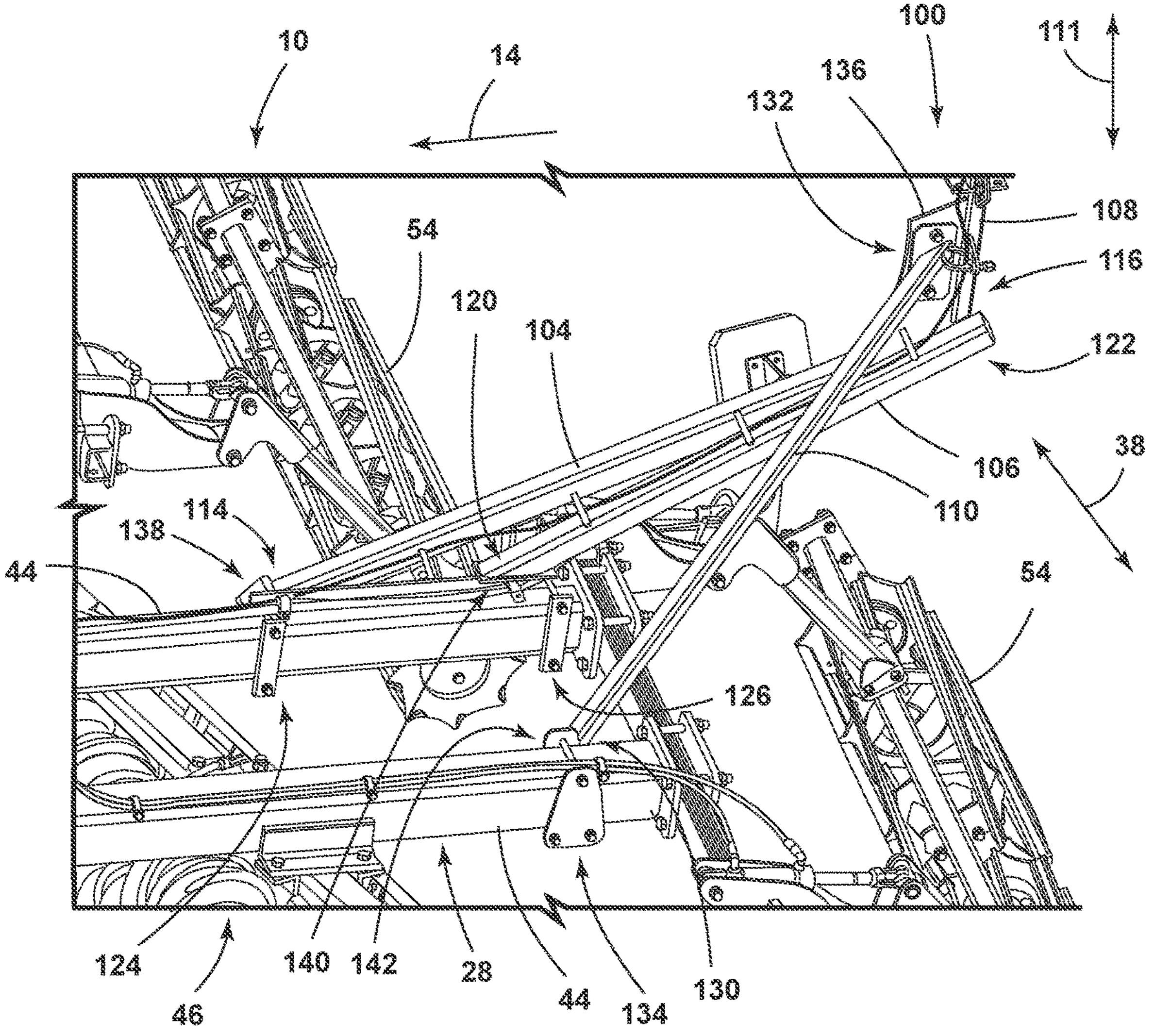
FIG. 3 illustrates another perspective view of the sensor support assembly shown in FIG. 2, particularly illustrating the sensor support assembly coupled to a frame of the agricultural implement.

FIG. 3 illustrates one embodiment of the mounting locations of the first and second support arms 104, 106 and the brace 110 on the implement frame 28. More specifically, the first end 114 of the first support arm 104 is coupled to one of the frame members 44 of the implement frame 28 at a first location 138. Similarly, the first end 120 of the second support arm 106 is coupled to one of the frame members 44 of the implement frame 28 at a second location 140. In general, the first and second locations 138, 140 are different. For example, as shown, in some embodiments, the first location 138 is positioned forward of the second location 140 relative to the direction of travel 14 of the implement 10. Additionally, in some embodiments, the first and second locations 138, 140 are spaced apart from each other in the transverse direction 38. In the illustrated embodiment, the first and second support arms 104, 106 are coupled to the same frame member 44. However, in alternative embodiments, the first and second support arms 104, 106 may be coupled to the different frame members 44.

Additionally, as mentioned above, in some embodiments, the brace 110 is coupled to the frame 28. Specifically, in such embodiments, the first end 130 of the brace 110 is coupled to one of the frame members 44 of the frame 28 at a third location 142. In general, the third location 142 is different from the first and second locations 138, 140. For example, as shown, in one embodiment, the third location 142 is positioned aft of the first location 138 relative to the direction of travel 14 of the implement 10. Additionally, the third location 142 is spaced apart from first and second locations 138, 140 in the transverse direction 38. In the illustrated embodiment, the brace 110 is coupled to a different frame member 44 than the first and second support arms 104, 106. However, in alternative embodiments, the brace 110 may be coupled to the same frame member 44 as the first and second support arms 104, 106.

In the illustrated embodiment, the first, second, and third mounting locations 138, 140, 142 are positioned adjacent to the aft end 36 of the implement 10. As such, the first, second, and third mounting locations 138, 140, 142 may be selected such that the sensor 102 is positioned aft of one or more ground-engaging tools of the implement 10 relative to the direction of travel 14. For example, in one embodiment, the sensor 102 supported on the sensor support assembly 100 is positioned aft of the disk gangs 46 of the implement 10. However, in alternative embodiments, the first, second, and third mounting locations 138, 140, 142 may be positioned at any other suitable locations on the implement 10.

Figure 4:
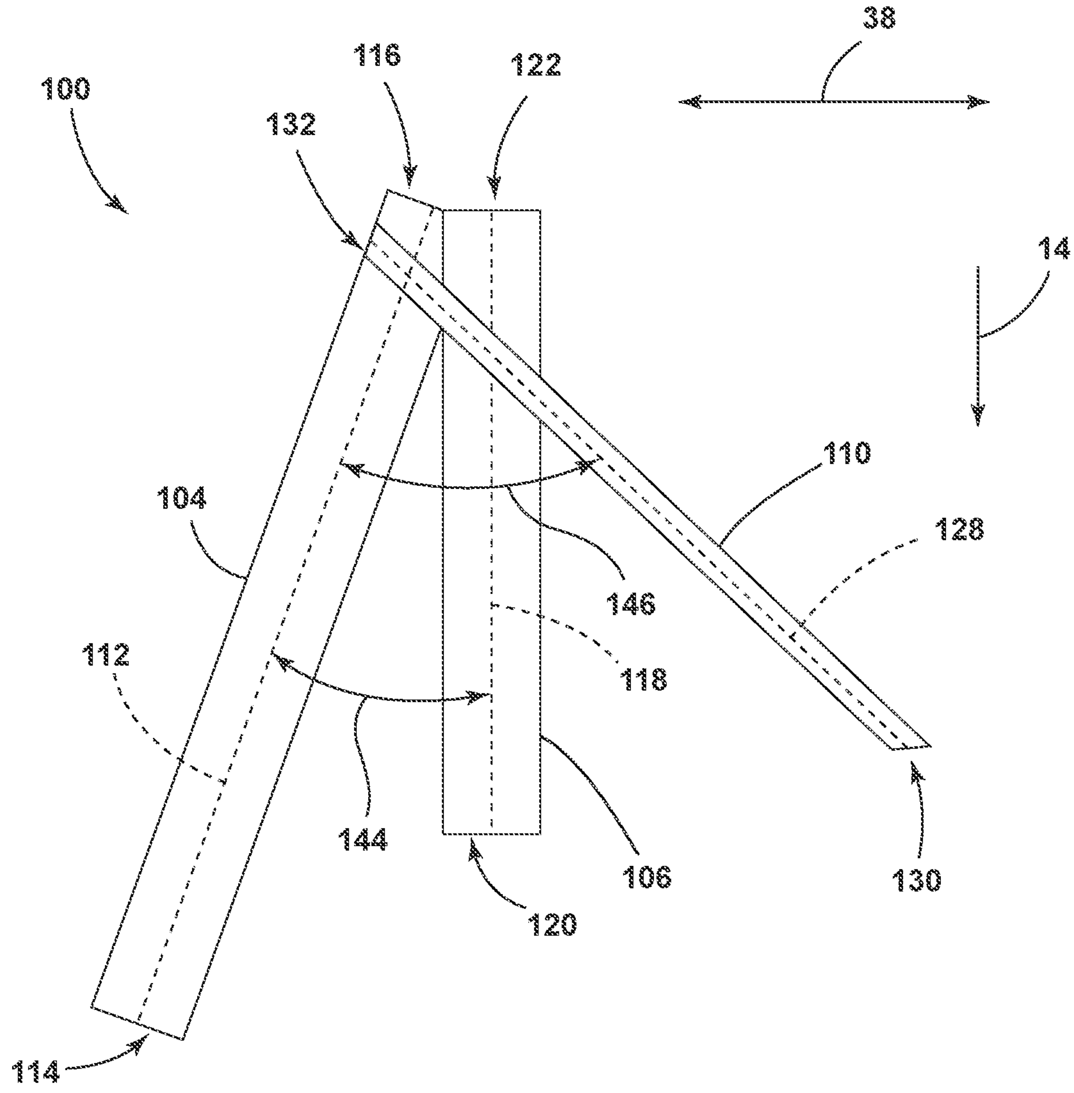
FIG. 4 illustrates a partial top view of the sensor support assembly shown in FIGS. 2 and 3, particularly illustrating the relative orientation of a first support arm, a second support arm, and a brace of the sensor support assembly.

FIG. 4 illustrates the relative positioning or orientation of the first and second support arms 104, 106 and the brace 110. Specifically, as shown, the first ends 114, 120 of the first and second support arms 104, 106 are spaced apart from each other in the transverse direction 38. Conversely, the second ends 116, 122 of the first and second support arms 104, 106 are coupled together. In this respect, a first oblique angle 144 is defined between the longitudinal axes 112, 118 of the first and second support arms 104, 106. Such positioning of the first and second support arms 104, 106 (i.e., with the first oblique angle 144 defined therebetween) improves the torsional strength of the sensor support assembly 100, thereby reducing or eliminating rotation of the sensor 102 when the implement 10 encounters a field impediment. This, in turn, improves the quality of the data being generated by the sensor 102, which allows for improved control of the agricultural implement 10.

Furthermore, the brace 110 is oriented relative to the first and second support arms 104, 106 to provide additional torsional strength. Specifically, as shown, the first end 130 of the brace 110 is spaced apart from the first and second support arms 104 in the transverse direction 38. Conversely, the second end 132 of the brace 110 is generally positioned adjacent to the second ends 116, 122 of the first and second support arms 104, 106. In this respect, a second oblique angle 146 is defined between the longitudinal axes 112, 128 of the first support arm 104 and the brace 110. In some embodiments, the first and second oblique angles 144, 146 are different. For example, in one embodiment, the second oblique angle 146 is greater than the first oblique angle 144. Such positioning of the brace 110 relative to the first support arm 104 (i.e., with the second oblique angle 146 defined therebetween) further improves the torsional strength of the sensor support assembly 100.

Referring again to FIG. 2, as mentioned above, in several embodiments, the sensor support assembly 100 may include the mounting arm 108. As shown, the mounting arm 108 is coupled between the first and second support arms 104, 106 and the sensor 102 in a vertical direction 111. Thus, the mounting arm 108 generally extends in the vertical direction 111 to position the sensor 102 at an elevated position relative to the implement frame 28.

Moreover, as mentioned above, the bracket 136 may be coupled to the mounting arm 108, such as on a forward side of the mounting arm 108. In this respect, the second end 132 of the brace 110, which is coupled to the bracket 136, may be positioned above the second ends 116, 122 of the first and second support arms 104, 106 in the vertical direction 111.

Additionally, in one embodiment, a shield 148 may be coupled to the mounting arm 108. As such, the shield 148 is configured to shield or otherwise protect the sensor 102 from solar radiation. Shielding the sensor 102 from solar radiation, in turn, protects the sensor 102 from heating due to direct solar exposure. Moreover, the shield 102 blocks light that could cause sensor interference.

Figure 5:
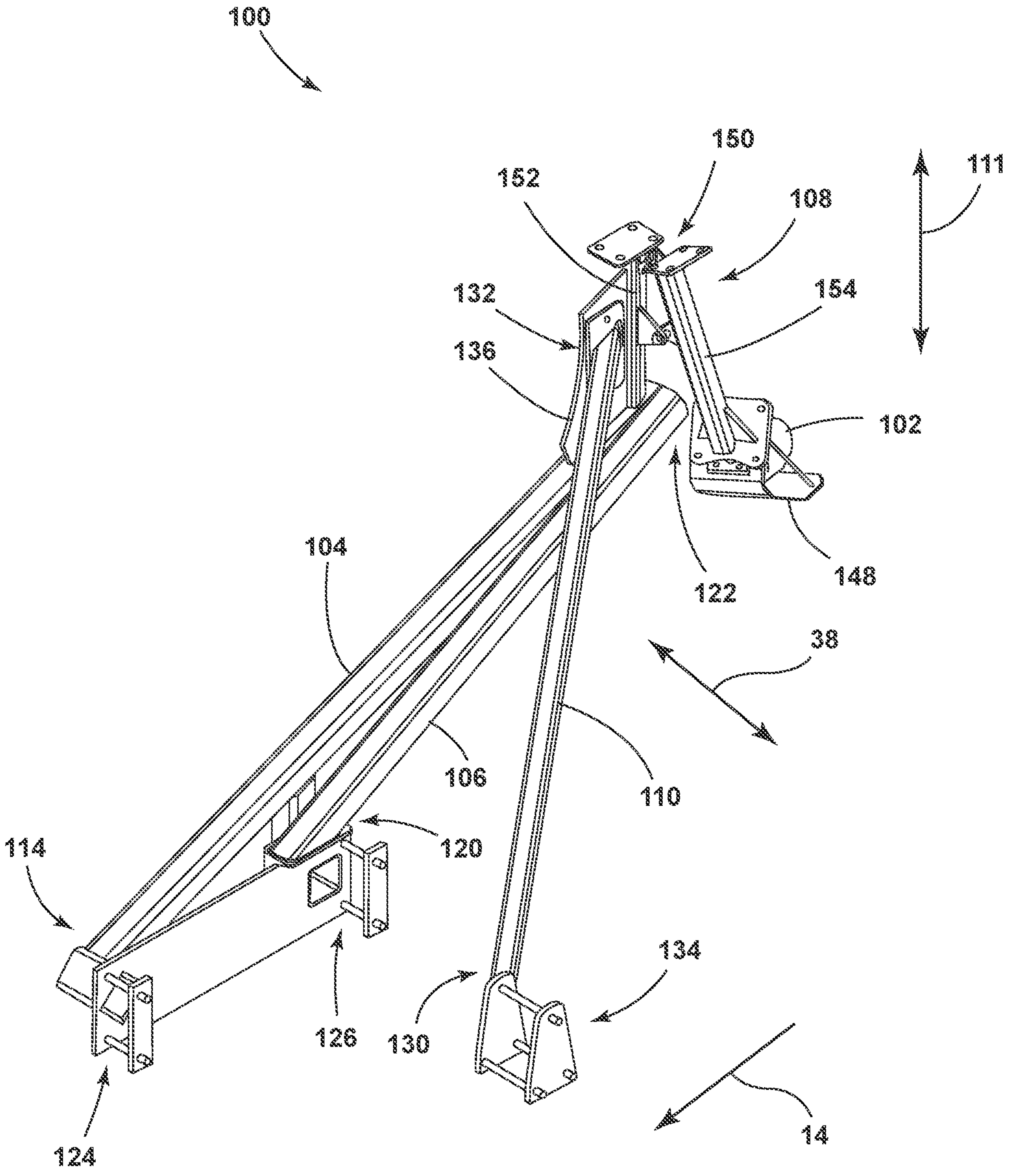
FIG. 5 illustrates a further perspective view of the sensor support assembly shown in FIGS. 2-4, particularly illustrating the sensor support assembly at a stowed position.

Furthermore, in some embodiments, the mounting arm 108 may be foldable. As such, the mounting arm 108 allows the sensor 102 to move between an operational position shown in FIG. 2 and a stowed position shown in FIG. 5. As shown in FIG. 2, when at the operational position, the mounting arm 108 is extended such that the sensor 102 is positioned at an elevated location relative to the implement frame 28 to generate data indicative of the field characteristics/parameters. For example, in one embodiment, when at the operational position, the sensor 102 is positioned aft of one or more ground-engaging tools of the implement 10, such as the disk blades 48 (FIG. 1), relative to the direction of travel 14 such that the field of view of the sensor 102 is directed at a portion of the field aft of the implement 10. Conversely, as shown in FIG. 5, when at the at the stowed position, the mounting arm 108 is folded such that the sensor 102 is stowed or otherwise positioned at a lower height relative to the frame 28. In this respect, positioning the sensor 102 at the stowed position may provide clearance for folding the implement frame 28.

In several embodiments, the sensor support assembly 100 includes a hinge 150 positioned between a first portion 152 of the mounting arm 108 and a second portion 154 of the mounting arm 108 such that the sensor 102 is movable between the operational and stowed positions. The first portion 152 of the mounting arm 108 is, in turn, coupled to the second ends 116, 122 of the first and second support arms 104, 106. Conversely, the second portion 154 of the mounting arm 108 is coupled to the sensor 102. However, in other embodiments, the mounting arm 108 may have any other configuration that permits movement of the sensor 102 between the operational and stowed positions. In the embodiment illustrated in FIGS. 2 and 5, the mounting arm 108 is manually foldable. Thus, in such an embodiment, the operator of the implement/vehicle 10/12 moves the sensor 102 between the operational and stowed positions.

Figure 6:
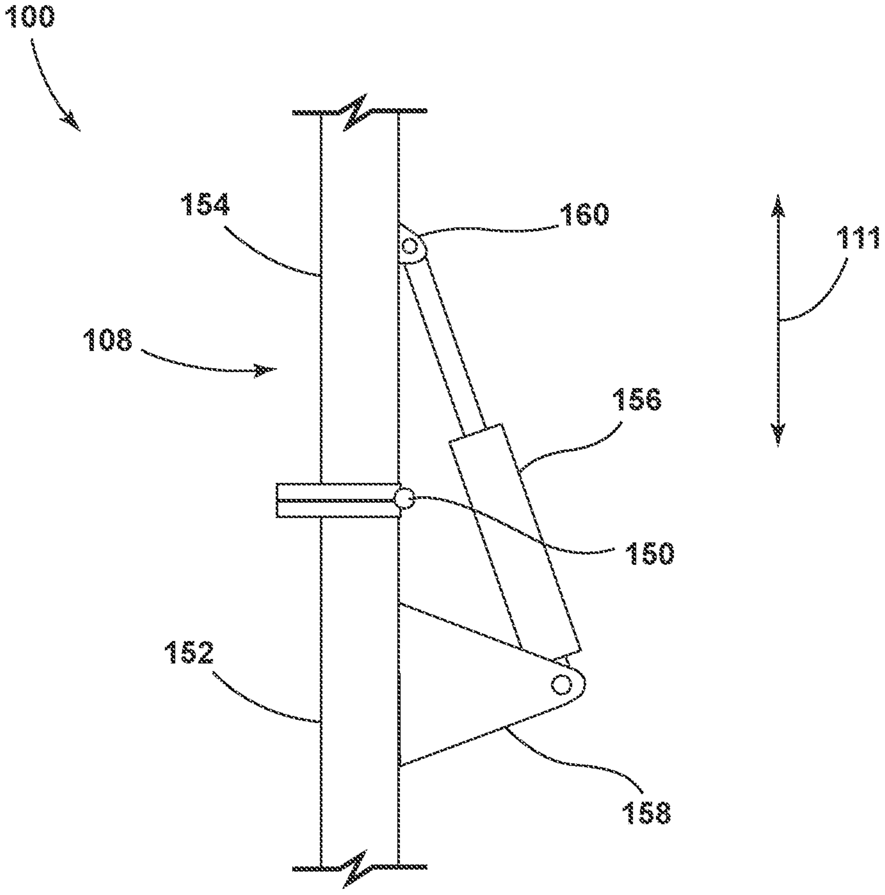
FIG. 6 illustrates a partial side view of another embodiment of a sensor support assembly in accordance with aspects of the present subject matter, particularly illustrating an actuator of the sensor support assembly.

However, as shown in FIG. 6, in other embodiments, the mounting arm 108 may be automatically foldable. Specifically, in such embodiments, an actuator 156 may be coupled between the first and second portions 152, 154 of the mounting arm 108. For example, one end of the actuator 156 may be coupled to a bracket 158, which is, in turn, coupled to the first portion 152 of the mounting arm 108. Conversely, an opposed end of the actuator 156 may be coupled to a bracket 160, which is, in turn, coupled to the second portion 154 of the mounting arm 108. Thus, the actuator 156 may be configured to fold the mounting arm 108 such that the sensor 102 is automatically moved between the operational and stowed positions.

In the illustrated embodiment, the actuator 156 is configured as a fluid-driven actuator, such as a hydraulic or pneumatic cylinder. However, in alternative embodiments, the actuator 156 may be configured as any suitable device capable of folding the mounting arm 108 about the hinge 150, such an electric linear actuator.

Additionally, the actuator 156 may be controlled in any suitable manner. For example, in one embodiment, the actuator 156 may be controlled based on operator inputs (e.g., inputs provided to a user interface (not shown) positioned within the cab 22 of the work vehicle 12). In other embodiments, the actuator 156 may be controlled based on sensor data (e.g., sensor data indicative of whether the implement 10 is in the folded or unfolded position, whether the implement 10 is performing an agricultural operation, etc.).

Alternatively, in other embodiments, the sensor support assembly 100 may have any other suitable configuration that allows the sensor 102 to move between the operational and stowed positions. For example, in some embodiments, the second portion 154 of the mounting arm 108 may extend/retract or otherwise telescope in the vertical direction 111 relative to the first portion 152 of the mounting arm 108 to move the sensor 102 between the operational and stowed positions. Additionally, the actuator 156 may be oriented such that the actuator 156 extends and retracts in the vertical direction 111 to move the sensor 102 between the operational and stowed positions.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:

a frame extending in a longitudinal direction between a forward end of the frame and an aft end of the frame, the frame further extending in a transverse direction between a first side of the frame and a second side of the frame, the transverse direction extending perpendicular to the longitudinal direction;

a ground-engaging tool supported on the frame;

a sensor configured to generate data indicative of a field parameter; and a sensor support assembly configured to support the sensor relative to the frame, the sensor support assembly comprising:

a first rigid support arm extending along a longitudinal axis of the first rigid support arm from a first end of the first rigid support arm to a second end of the first rigid support arm, the first end of the first rigid support arm coupled to the frame, the second end of the first rigid support arm coupled to the sensor; and a second rigid support arm extending along a longitudinal axis of the second rigid support arm from a first end of the second rigid support arm to a second end of the second rigid support arm, the first end of the second rigid support arm coupled to the frame, the second end of the second rigid support arm coupled to the sensor, wherein an oblique angle is defined between the longitudinal axis of the first rigid support arm and the longitudinal axis of the second rigid support arm in a plane defined by the longitudinal direction and the transverse direction.

2. The agricultural implement of claim 1, wherein the first end of the first rigid support arm is coupled to the frame at a first location and the first end of the second rigid support arm is coupled to the frame at a second location, the first location being different than the second location.

3. The agricultural implement of claim 2, wherein the first location is spaced apart from the second location in the transverse direction.

4. The agricultural implement of claim 2, wherein the first location is positioned forward of the second location relative to a direction of travel of the agricultural implement and along the longitudinal direction.

5. The agricultural implement of claim 1, wherein the sensor support assembly further comprises:

a mounting arm coupled between the first and second rigid support arms and the sensor in a vertical direction extending perpendicular to the longitudinal direction and the transverse direction.

6. The agricultural implement of claim 5, wherein the sensor support assembly further comprises:

a hinge positioned between a first portion of the mounting arm and a second portion of the mounting arm such that the sensor is movable between an operational position and a stowed position.

7. The agricultural implement of claim 6, wherein the sensor support assembly further comprises:

an actuator configured to automatically move the sensor between the operational position and the stowed position.

8. The agricultural implement of claim 6, wherein the ground-engaging tool comprises a vertical tillage tool, the sensor being positioned aft of the vertical tillage tool when the sensor is positioned at the operational position.

9. The agricultural implement of claim 5, wherein the sensor support assembly further comprises:

a shield coupled to the mounting arm, the shield configured to shield the sensor from solar radiation.

10. The agricultural implement of claim 5, wherein the sensor support assembly further comprises:

a bracket coupled to the mounting arm.

11. The agricultural implement of claim 10, wherein the sensor support assembly further comprises:

a brace extending along a longitudinal axis of the brace from a first end of the brace to a second end of the brace, the first end of the brace coupled to the frame, the second end of the brace coupled to the bracket.

12. The agricultural implement of claim 11, wherein:

the first end of the first rigid support arm is coupled to the frame at a first location;

the first end of the second rigid support arm is coupled to the frame at a second location; and the first end of the brace is coupled to the frame at a third location, the third location being spaced apart from the first and second locations in the transverse direction.

13. The agricultural implement of claim 12, wherein the third location is positioned aft of the first location relative to a direction of travel of the agricultural implement along the longitudinal direction.

14. The agricultural implement of claim 12, wherein:

the oblique angle corresponds to a first oblique angle; and a second oblique angle is defined between the longitudinal axis of the first rigid support arm and the longitudinal axis of the brace in the plane defined by the longitudinal direction and the transverse direction, the second oblique angle being different than the first oblique angle.

15. The agricultural implement of claim 11, wherein the second end of the brace is positioned above the second ends of the first and second rigid support arms in the vertical direction.

16. The agricultural implement of claim 1, wherein the sensor comprises a LiDAR sensor.

17. A tillage implement, comprising:

a frame extending in a longitudinal direction between a forward end of the frame and an aft end of the frame, the frame further extending in a transverse direction between a first side of the frame and a second side of the frame, the transverse direction extending perpendicular to the longitudinal direction;

a vertical tillage tool supported on the frame;

a sensor configured to generate data indicative of a field parameter; and a sensor support assembly configured to support the sensor relative to the frame, the sensor support assembly comprising:

a first support arm extending along a longitudinal axis of the first support arm from a first end of the first support arm to a second end of the first support arm, the first end of the first support arm coupled to the frame at a first location, the second end of the first support arm coupled to the sensor;

a second support arm extending along a longitudinal axis of the second support arm from a first end of the second support arm to a second end of the second support arm, the first end of the second support arm coupled to the frame at a second location, the second location being different than the first location, the second end of the second support arm coupled to the sensor;

a mounting arm coupled between the first and second rigid support arms and the sensor in a vertical direction extending perpendicular to the longitudinal direction and the transverse direction;

a bracket coupled to the mounting arm; and a brace extending along a longitudinal axis of the brace from a first end of the brace to a second end of the brace, the first end of the brace coupled to the frame at a third location, the third location being spaced apart from the first and second locations in the transverse direction, the second end of the brace coupled to the bracket;

wherein;

a first oblique angle is defined between the longitudinal axis of the first support arm and the longitudinal axis of the second support arm in a plane defined by the longitudinal direction and the transverse direction, and a second oblique angle is defined between the longitudinal axis of the first rigid support arm and the longitudinal axis of the brace in the plane defined by the longitudinal direction and the transverse direction, the second oblique angle being different than the first oblique angle.

18. The tillage implement of claim 17, wherein the first location is spaced apart from the second location in the transverse direction.

19. The tillage implement of claim 17, wherein the first location is positioned forward of the second location relative to a direction of travel of the agricultural implement and along the longitudinal direction.

20. The tillage implement of claim 17, wherein the second oblique angle is greater than the first oblique angle.

* * * * *